US009451077B2

(12) United States Patent
Duvaut (10) Patent No.: US 9,451,077 B2
(45) Date of Patent: Sep. 20, 2016

(54) DEVICE-BASED SAFEGUARD SYSTEMS AND METHODS FOR ENHANCING DRIVER SAFETY

(71) Applicant: Patrick Duvaut, Neuilly sur Seine (FR)

(72) Inventor: Patrick Duvaut, Neuilly sur Seine (FR)

( * ) Notice: Subject to any disclaimer, the term of this patent is extended or adjusted under 35 U.S.C. 154(b) by 0 days.

(21) Appl. No.: 14/629,823

(22) Filed: Feb. 24, 2015

(65) Prior Publication Data

US 2016/0248904 A1 Aug. 25, 2016

(51) Int. Cl.
| | | |
|---|---|---|
| *H04M 3/00* | (2006.01) | |
| *H04M 1/725* | (2006.01) | |
| *H04W 4/02* | (2009.01) | |
| *H04W 4/04* | (2009.01) | |

(52) U.S. Cl.
CPC ......... *H04M 1/72577* (2013.01); *H04W 4/027* (2013.01); *H04W 4/046* (2013.01)

(58) Field of Classification Search
CPC .......................... H04W 48/04; H04W 52/0254
USPC ...... 455/418, 456.1, 517, 419, 456.4, 550.1;
340/425.5, 686.1
See application file for complete search history.

(56) References Cited

U.S. PATENT DOCUMENTS

| | | | |
|---|---|---|---|
| 8,526,973 B2 | 9/2013 | Thomson | |
| 8,761,821 B2 * | 6/2014 | Tibbitts | H04W 48/04 455/297 |
| 2013/0237207 A1 * | 9/2013 | Howarter | H04W 8/24 455/418 |
| 2014/0287738 A1 | 9/2014 | Abramson et al. | |
| 2014/0335902 A1 * | 11/2014 | Guba | H04W 4/027 455/456.4 |

OTHER PUBLICATIONS

Richard F. and Roussarie V. "Sound Design in Car Passenger Compartment, Process and Tool for Control of Engine Sound Character" Proceedings of Sound Design, Oct. 2004.
Stantovic L. and Böhme J. "Time-Frequency Analysis of Multiple Resonances in Combustion Signals", Signal Processing 79, 1999.
Guillemain P. and Kronland-Martinet R., "Characterization of acoustic signals through continuous linear time-frequency representations" Proceedings of the IEEE, vol. 84, No. 4, Apr. 1996.
Egmont-Petersen, M., de Ridder, D., Handels, H., "Image processing with neural networks—a review". Pattern Recognition 35: 2279-2301, (2002).
"Your Phone Is Locked. Just Drive." David Pogue; New York Times 2010.

\* cited by examiner

*Primary Examiner* — Kiet Doan
(74) *Attorney, Agent, or Firm* — McClure, Qualey & Rodack, LLP (57) ABSTRACT

A mobile computing device senses movement by a vehicle in which the mobile computing device is located, and in response to sensing movement by the vehicle, the mobile computing device determines a location of the mobile computing device relative to an interior of the vehicle. In response to determining that the mobile computing device is in a target zone and in response to detecting interaction with the mobile computing device by a user, the mobile computing device detects an occurrence of a distracted driving event and restricts at least one functionality of the mobile computing device. The mobile computing device then logs the occurrence of the distracted driving event in a restricted access data store.

21 Claims, 5 Drawing Sheets

DEVICE-BASED SAFEGUARD SYSTEMS AND METHODS FOR ENHANCING DRIVER SAFETY

TECHNICAL FIELD

The present disclosure generally relates to enhancing driver safety while the driver is in a moving vehicle and more particularly, to a system and method for restricting distracted driving behavior due to talking and/or texting on a mobile device.

BACKGROUND

Road traffic crashes are a global public health problem, contributing in 2013 to an estimated 1.3 million deaths annually, and mobile device use while driving has become an emerging concern. In 2011, online surveys of drivers aged 18-64 years revealed that the percentage of those who reported that they had talked on their cell phone while driving ranged from 21% in the United Kingdom to 69% in the United States, and the percentage of those that reported that they had read or sent text or e-mail messages while driving ranged from 15% in Spain to 31% in Portugal and the United States, as set forth in the Morbidity and Mortality Weekly Report published by the Centers for Disease Control and Prevention on Mar. 15, 2013.

To address the problem of mobile device use while driving, many countries consider examining the use of road traffic injury prevention strategies (e.g., legislation combined with high-visibility enforcement by police officers) that have been successful in reducing the prevalence of other road safety risk factors (e.g., alcohol-impaired driving and seat belt non-use). Additionally, the effectiveness of emerging vehicle and mobile communication technologies should be studied to assess their role in reducing crashes related to distracted driving.

On Mar. 12, 2014, the U.S. Department of Transportation, the National Highway Transportation Safety Administration (NHTSA) hosted a public meeting on the development of Driver Distraction Guidelines for Portable and Aftermarket Devices. Expert panelists included executives from AT&T, General Motors, Toyota, Cellepathy, and others, where it was noted that in the world of distracted driving there are two main categories of solutions: vehicle-based and device-based technologies.

Vehicle based approaches such as the approach described in U.S. Pat. No. 8,526,973 to Thomson require extra hardware which results in extra cost and which may not work on all vehicles. Moreover, when dealing with car improvements, the roll-out period may extend up to 20 years to disseminate to at least 90% of the vehicles in one particular country.

On the other hand, device based solutions such as the one described in U.S. Pub. No. 2014/0287738 to Abramson work in every vehicle, have no marginal cost, and may be deployed in a 4-years roll-out time frame, even nationwide. Available device-based systems generally comprise three basic functionalities: 1) "Car trip" detection; 2) Automatic Mandatory Driver Mode; and 3) Passenger Authentication (which allows to accurately authenticate who is holding the mobile device: a car passenger versus the driver, in order to solve the so-called "passenger problem."

However, the advanced device-based available systems that incorporate the features above experience the following perceived shortcomings. Specifically, the systems: 1) are not "privacy-proof" up to a tunable degree; b) are not fully-seamless (for instance the Abramson approach requires a burdensome "Passenger Authentication Test"); c) are not adaptive to the specifics of "regional legislation" and/or "professional best practices/rules"; d) do not distinguish between all the possible "transportation means" in which the mobile device is eventually moving (i.e., car/truck versus any other transportation: metro, bus train, plane, etc.); e) do not provide "customized incentives" to improve Distracted Driving due to Talking and/or Texting on Mobile device (D2T2M) behavior; f) do not provide "personal analytics & mobile-based" coaching to improve the driver D2T2M behavior; and g) do not comprise two generic mode of operations: (device) connected to the Internet or not connected (pure local usage).

SUMMARY

Briefly described, one embodiment, among others, is a method implemented in a mobile computing device, where the method comprises sensing movement by a vehicle in which the mobile computing device is located. In response to sensing movement by the vehicle, the mobile computing device determines a location of the mobile computing device relative to an interior of the vehicle, while protecting the privacy of the mobile computing device user. In response to determining that the mobile computing device is in a target zone and in response to detecting interaction with the mobile computing device by a user, the mobile computing device detects an occurrence of a distracted driving event and restricts at least one functionality of the mobile computing device. The mobile computing device then logs the occurrence of the distracted driving event in a restricted access data store.

Another embodiment is a mobile computer-implemented system that comprises a memory configured to store computer-executable instructions and a processor configured to execute the computer-executable instructions to at least: sense movement by a vehicle in which the mobile computing system is located; responsive to sensing movement by the vehicle, determine a location of the mobile computing system relative to an interior of the vehicle; responsive to determining that the mobile computing system is in a target zone and responsive to detecting interaction with the mobile computing system, detect an occurrence of a distracted driving event and restricting at least one functionality of the mobile computing system; and log the occurrence of the distracted driving event in a restricted access data store.

Another embodiment is a non-transitory computer-readable medium embodying a program executable in a mobile computing device. The program comprises code that senses movement by a vehicle in which the mobile computing system is located and code that determines a location of the mobile computing system relative to an interior of the vehicle responsive to sensing movement by the vehicle. The program further comprises code that detects, responsive to determining that the mobile computing system is in a target zone and responsive to detecting interaction with the mobile computing system, an occurrence of a distracted driving event and restricting at least one functionality of the mobile computing system and code that logs the occurrence of the distracted driving event in a restricted access data store.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for implementing a broad array of device-based seamless technologies that incorporate customer-centric incentives and dedicated "personal analytics-based" coaching methodologies to reduce talking and/or texting while driving in order to achieve the basic functionalities of car trip detection, automatic mandatory driver mode, and passenger authentication.

Various implementations may be embodied as instructions executing on a processor of a mobile device 102 that utilize existing sensors on any mobile device, where the safeguard mechanism may be pluggable in any mobile device and tunable to meet region-specific requirements, where such requirements may be tied to enforced legislation, such as a strict ban on talking/texting while driving. Various implementations provide for the possibility of locking the mobile device if the driver is using his mobile device 102 or allowing some kind of tolerance regarding hand free mobile equipment and/or other Distracted Driving due to Talking and/or Texting on Mobile device (D2T2M) activities.

Figure 1:
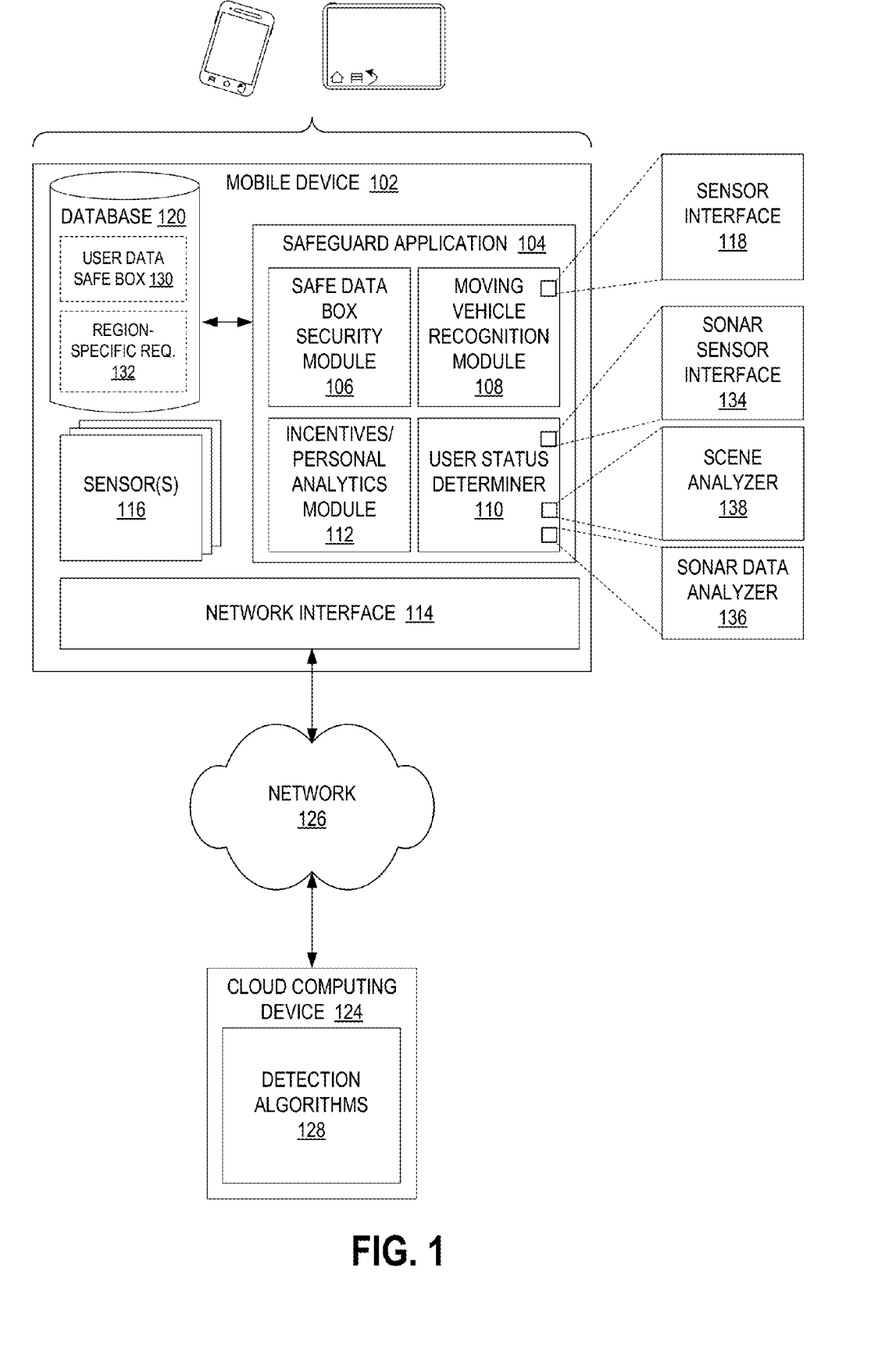
FIG. 1 is a block diagram of a mobile device in which the safeguard features disclosed herein may be implemented in accordance with various embodiments of the present disclosure.

A description of a system in which a safeguard application may be implemented for restricting D2T2M activities is now described followed by a discussion of the operation of the components within the system. FIG. 1 is a block diagram of a mobile device 102 in which the safeguard features disclosed herein may be implemented. The mobile device 102 may be embodied as a smartphone, a tablet computing device, or other portable computing device. A safeguard application 104 executes on a processor of the mobile device 102 and includes various components including a safe data box security module 106, a moving vehicle recognition module 108, a user status determiner 110, and an incentives/personal analytics module 112. As further shown in FIG. 1, the mobile device 102 may also include a network interface 114 for interfacing with such remote entities as a cloud computing device 124 via a network 126.

In accordance with a first aspect of an exemplary embodiment, detection of moving transportation means is performed by the moving vehicle recognition module 108 that seamlessly detects movement by "listening" via sensors 116 (e.g., a microphone) in the mobile device 102 using a sensor interface 118 and performing moving vehicle recognition based on machine learning algorithms executed locally, directly on the mobile device 102. The safeguard application 104 executing on the mobile device 102 may be configured to initially run in a low power consumption mode and then transition out of the low power consumption mode where additional resources are allocated as soon as the mobile device 102 detects that the mobile device 102 is within a vehicle. For some embodiments, the mobile device 102 may be further configured to transition out of the lower power consumption mode upon detecting whether the engine of the vehicle has been turned on by analyzing sound signals captured by the microphone of the mobile device 102.

The additional resources allocated for the safeguard application 104 may include, for example, computing resources normally allotted for providing text messaging and/or voice services on the mobile device 102, where text messaging and voice services may be restricted when the mobile device 102 detects that the user of the mobile device 102 has entered a vehicle or when movement of the vehicle is detected, as described in more detail below. The restrictions may be imposed until the mobile device 102 confirms that the user of the mobile device 102 is not a driver. In general, the moving vehicle recognition algorithm does not require any calibration as the algorithm relies on time-frequency patterns learned off-line and on real time detection. First, a time-frequency representation of the sounds sensed by the microphone is derived based on a spectrogram analysis, Wigner-Ville analysis, wavelet analysis, Markov chain modeling or any combination of these techniques.

For some embodiments, a spectrogram SP(t, f) of the recorded sound may be calculated according to the following:

$$SP(t,f) = |\Sigma_{k=0}^{N-1} w(t-k)so(k)e^{-j2\pi kf}|^2$$

where so(k) represents the sampled sound recorded by the microphone, w(t) is a window in which the sampled sound undergoes smoothing, and N is the number of sound samples used for the processing. The spectrogram SP(t, f) provides a frequency (f) versus time (t) image, which represents the frequency content of the sound as a function of time as this frequency content may vary. The spectrogram facilitates building a frequency-time pattern of the vehicle status. For instance, if the vehicle engine is off, the sampled sound pattern will reflect the presence of various noise sources in the environment and will look like random peaks of energy scattered in the frequency-time plane without any shape coherence. On the other hand, if the engine is on but the vehicle is not moving, the rotation of the engine is stable and the frequency-time pattern will look like a straight line (single frequency) versus time. If the vehicle begins to move, the engine accelerates and the rotation frequency will grow (e.g., before the first gear change). In this case, the frequency-time pattern will approximately be represented by a line with a positive slope as a function of time, also known as a positive chirp pattern. If the car brakes (before the first gear change after the breaking starts), then the rotation frequency of the engine will decrease and the frequency-time pattern will have the shape of a negative slope line versus time, also know as a negative chirp pattern.

Figure 4:
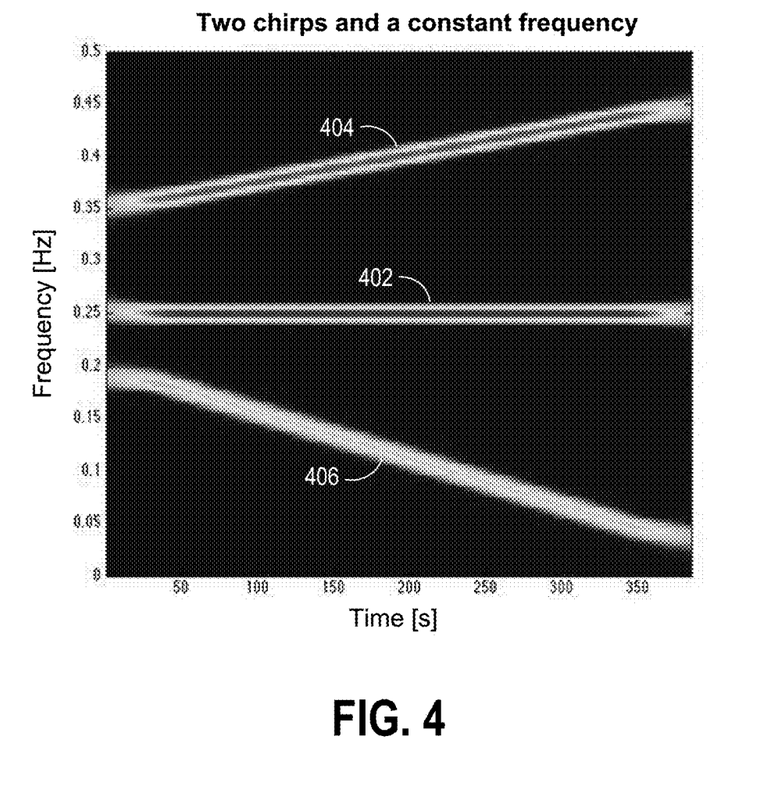
FIG. 4 depicts spectrograms corresponding to a single frequency pattern, a positive chirp pattern, and a negative chirp pattern.

Reference is made to FIG. 4, which depicts spectrograms of the three frequency-time patterns described above: 1) the single frequency pattern 402 (engine is on but the vehicle is stationary, or whether the vehicle speed is perfectly stable); 2) a positive chirp pattern 404 (where the vehicle begins moving or accelerates before the first consecutive gear change); and 3) a negative chirp pattern 406 (where the vehicle brakes/decelerates). Note that the spectrograms in FIG. 4 are illustrative only and do not necessarily represent the frequency-time image of a particular engine belonging to a specific car brand.

Next, pre-processing of the time-frequency representation is performed to improve signal-to-noise ratio of the time-frequency images, where such pre-processing may comprise, for example, mitigating pixels in the images of the time-frequency representation that are not structured like pixels associated with time-frequency representation signals stemming from a running engine, acceleration by the vehicle, and braking by the vehicle. The noise pixels are mitigated by applying a two dimensional low pass filter (such as a linear Gaussian filtering) or a 2D median non-linear filter. The 2D median filter will help maintain the levels of original pixels that bear the "engine status signature" and that are not too noisy. A time-frequency acceleration event is detected if either a positive or negative frequency modulation value is obtained from the time-frequency analysis (see spectrograms in FIG. 4). While the use of frequency-time patterns to characterize the engine status is known, the systems disclosed herein seek to leverage this technique for preventing and limiting D2T2M by detecting when the vehicle is moving.

The steps above may be characterized as a digital accelerometer function performed by the mobile device 102. The time-frequency local domain where such time-frequency acceleration has been detected and localized serves as a time-frequency window for extracting a time-frequency acceleration pattern that combines both time-frequency and amplitude features (for instance any of the three patterns discussed above). Next, this time-frequency acceleration pattern is used to identity the type of moving vehicle in which the mobile device 102 is currently located.

For some embodiments, identification of the vehicle type may be achieved utilizing a database of acceleration patterns that is updated each time the safeguard features disclosed herein are activated. Various supervised or unsupervised pattern recognition algorithms may be used to detect a moving vehicle and the type of moving vehicle, such as, but not limited to linear discriminant analysis, maximum Entropy classifier, Decision Tree, Bayesian Classifier, Neural Network, Support Vector Machine, Deep learning, Hierarchical clustering, Kernel principal component analysis, K-means clustering, and so on.

A database 120 may be utilized to store past data comprising time-frequency representation signals associated with vehicle movement, where the training data in the database 120 is enriched each time safeguard measures are activated by the safeguard application 104. Enrichment of the training data serves to enhance the accuracy of moving vehicle recognition. The database 120 may be updated during periods of non-use (e.g., when the mobile device 102 is idle at night). For some embodiments, the mobile device 102 may be configured to download time-frequency representation signals for moving vehicle recognition using the network interface 114.

Based on whether a moving vehicle is detected, the safeguard application 104 may restrict the use of certain functions (e.g., text messaging) on the mobile device 102. Note that the moving vehicle recognition generally does not require an Internet connection by the mobile device 102, although the moving vehicle recognition algorithm may be further enhanced by providing access to a database of detection algorithms 128 maintained by a cloud-based computing device 124 such as the one shown in FIG. 1. The detection fully respects the user's privacy as the algorithm does not rely on global positioning system (GPS) data or other location data.

Time-related information (e.g., day, time stamps) regarding a user's movement in a vehicle is safely guarded on a private piece of the available memory of the mobile device 102, referred to herein as a user data safe box 130, as shown in FIG. 1. This user data safe box 130 may be opened, read, manipulated, and shared only under the sole user control, unless this information is required by law enforcement authorities because of fatalities/crashes and/or investigations involving, for example, a search warrant. Access to the user data safe box 130 is restricted and controlled by the safe data box security module 106 shown in FIG. 1.

Access to the local user data safe box 130 may be extended to remote access by the user or by anybody else who has been granted the rights by the user himself (or by law), if there is an Internet connection. This remote access can be achieved by mere duplication of the local user data safe box 130 on the cloud which converts the local safe data box as a cloud user data safe box 130. Since the disclosed safeguard approach is seamless and fully respects user privacy, various embodiments can be adapted to any regional and/or professional specifics regarding the usage of personal data and also according to the regional D2T2M legislation. Note that regional and/or professional requirements 132 may be stored locally in the database 120, as shown in FIG. 1. The detection method may be extended to other means of moving transportation for professional reasons to assure, for instance, that metro/bus/tram/train drivers are not engaged in D2T2M behavior. This may be achieved via simple settings of the safeguard mode of operation.

In accordance with a second aspect of an exemplary embodiment, the two steps of automatic mandatory driver mode and passenger authentication are replaced by a single fast (i.e., on the order of a few seconds) and seamless operation that automatically detects whether the mobile device 102 user is the driver or a mere passenger in response to a determination that the mobile device is actually inside a moving car/truck or any moving vehicle that requires special monitoring for professional and safety reasons.

The "driver versus passenger" detection algorithm is performed by the user status determiner 110 in FIG. 1 and does not require any special test and fully respects the user's privacy. For some embodiments, the driver versus passenger detection performed by the user status determiner 110 utilizes the speaker and the microphone of the mobile device via a sonar sensor interface 134. Similar to the use of sonar technologies, the mobile speaker emits a series of appropriate acoustics signals that bounce back on the entire indoor vehicle frame and passengers of the moving vehicle. The echoes are then analyzed locally, directly on the device to determine if the user is the driver or merely a passenger based on the analysis. The overall driver versus passenger detection method does not require any calibration and utilizes the speaker, microphone, and camera components of the mobile device 102.

For some embodiments, as soon as the moving vehicle recognition module 108 detects movement by the vehicle, the user status determiner 110 applies both a camera monitoring approach and a sonar approach for determining the user status (driver versus passenger). As described below, however, the user status determiner 110 may alternatively be configured to execute one of the approaches. Thus, a camera monitoring approach, a sonar approach or a combination of these approaches may be applied.

For embodiments where both approaches are applied, the user status determiner 110 automatically switches on the camera and commands the speaker to emit trains of pulses, such as chirps (time-frequency modulations with different profiles) that have been optimized off-line and recorded locally on the device. Sound echoes are sensed by the microphone and are processed by the sonar data analyzer 136. Specifically, the sonar data analyzer 136 correlates sound echoes with the emitted pulses and/or time-Frequency analysis of the echoes, based on spectrogram analysis, Wigner-Ville analysis, wavelets analysis, Markov Chains Modeling analysis, etc. to derive delay maps, which are representative of the number of delays, delay values, delay amplitudes, echo shapes, and so on. Note while the user status determiner 110 may be configured to automatically switch on the camera and command the speaker to emit trains of pulses, the user status determiner 110 may also be configured to apply either technique (camera monitoring and sonar) individually.

Figure 5:
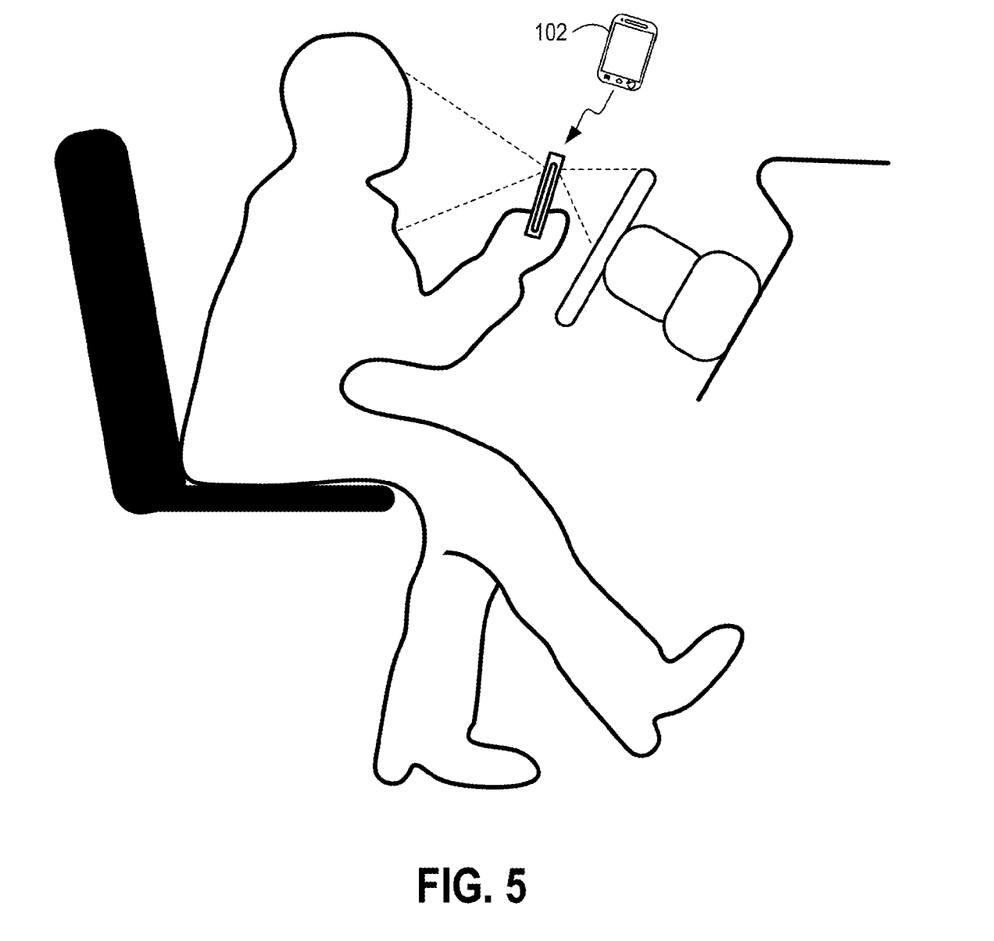
FIG. 5 illustrates application of the camera monitoring approach in accordance with various embodiments.

Reference is made to FIG. 5, which illustrates application of the camera monitoring approach in accordance with various embodiments. Today, many mobile devices 102 are equipped with both a main (back facing) camera for taking higher resolution photos/videos and a front facing camera for taking "selfies" and for video-conferencing. For some embodiments, as soon as the main camera is turned on, the algorithm instructs the mobile device 102 to alternately capture images with the main camera and the front facing camera, where the algorithm may alternate between these cameras on a periodic basis (e.g., every half second). This allows the algorithm to capture a 360° view around the mobile device 102 via pictures and/or videos, thereby providing a full view of the mobile device 102 holder and taking pictures of what the user is doing.

Note that the algorithm does not require any action by the user. Even if the mobile device 102 is placed in a mount, the algorithm is still able to capture roughly a 360° view around the mobile device 102. Notably, the captured photos and/or videos will typically be sufficient for allowing the algorithm to determine whether the user is a passenger or the driver in the vehicle. Real time scene recognition algorithms, whether employing supervised techniques (e.g., via neural networks, SVM, Bayesian) or unsupervised techniques (e.g., deep learning, Hierarchical clustering, Kernel principal component analysis, K-means clustering), are able to easily and accurately detect whether the user of the mobile device 102 is sitting in front of the steering wheel or sitting in a passenger seat.

Neural networks and deep learning techniques have already been applied in a wide range of image processing problems, including identification and authentication purposes, fingerprint analysis and face detection/verification, medical diagnosis, a various defense related application (e.g., navigation and guidance systems, target recognition systems). The systems and methods disclosed herein leverage such techniques for acquiring a 360° view around the mobile device 102 for purposes of determining the status of the user (i.e., driver versus passenger). Notably, the use of such techniques allows the disclosed systems to operation without any need for calibration or special testing prior to operation. Furthermore, the driver versus passenger detection algorithm operates effectively regardless of whether other individuals are present in the vehicle. For example, based on a view of the steering wheel from the perspective of the camera on the mobile device 102, the scene analyzer 138 may predict that the user is likely positioned in the driver seat, regardless of whether other individuals are present.

The scene analyzer 138 is not limited to monitoring objects in the vehicle and may also be configured to analyze movement by the user's eyes. For example, if the scene analyzer 138 senses intermittent eye contact with the display of the camera, the scene analyzer 138 may predict that the user is driving (and thus looking ahead) while using the mobile device 102. Both the delay maps generated by the sonar data analyzer 136 and the scene analysis data derived by the scene analyzer 138 are combined to build an approximate three-dimensional (3D) map of the objects around the mobile device 102. Based on the approximate 3D map, the user status determiner 110 predicts whether the user of the mobile device 102 is a driver or merely a passenger in the vehicle.

The analysis algorithms applied by the sonar data analyzer 136 in FIG. 1 are based on statistical signal processing and localization algorithms that yield a three-dimensional (3D) coarse space map of the interior of the vehicle and specifically the relative position of the mobile device 102 user with respect to the vehicle steering wheel and with respect to the different boundaries of the vehicle frame. These parameters allow the system to accurately distinguish whether the mobile device 102 user of the moving vehicle is a driver. Note that all photos/videos captured during execution of the driver versus passenger detection algorithm are stored in the safe box to protect the privacy of the user.

During the few seconds needed to perform the driver versus passenger detection, functionality corresponding to phone calls and/or texting is restricted on the mobile device 102. Furthermore, the phone will be placed in a busy mode for any incoming call, while any incoming SMS will be stored for future retrieval. The stored SMS will not be readable unless the user is determined to be a passenger by the safeguard application 104. If the mobile device 102 user is identified as the driver, then actions are undertaken on the mobile device 102 that comply with the regional and/or professional regulations regarding D2T2M. The mobile device 102 may be placed in a restricted use mode, where the level of functionality accessible by the user may be defined based on the regional and/or professional regulations.

The detection algorithm does not require any connection to the Internet although the algorithm can be improved if the access to a data base on the cloud is made available. The detection algorithm applied by the safeguard application 104 fully respects the user's privacy since the algorithm does not rely on GPS data, selfies-based identification tests of the user, etc. Time-related information (e.g., day, time stamps) and all other inputs (e.g., sounds, videos, pictures) collected to determine the user's status (passenger versus driver) and collected information regarding a user's activities while in a moving vehicle is safely guarded in a restricted access portion of the available memory of the mobile device 102 designated as a local user data safe box 130. This local user data safe box 130 may be opened, read, manipulated and shared only under the sole user control, unless this information is required by law enforcement authorities because of fatalities/crashes and/or investigations involving, for example, a search warrant.

Access to the local user data safe box 130 may be extended to remote access by the user or by anybody else who has been granted the rights by the user himself (or by law), if there is an Internet connection. Remote access may be achieved by mere duplication of the local user data safe box 130 on the cloud which converts the local safe data box as a cloud user data safe box 130. Since the disclosed safeguard approach is seamless and fully respects user privacy, various embodiments may be adapted to any regional and/or professional specifics regarding the usage of personal data and also according to the regional D2T2M legislation. The detection method can be extended to other means of moving transportation for professional reasons to assure, for instance, that metro/bus/tram/train drivers are not engaged in D2T2M. This will be achieved via simple settings of the safeguard mode of operation.

During a trip, even with a mobile device that was previously detected as belonging to a "mere passenger", the driver versus passenger detection algorithm described earlier involving 360° scene recognition and/or sonar type localization techniques are performed periodically to avoid "passenger collision" where the interval is programmable. It should be noted that while the safeguard application 104 disclosed herein does not require access to the Internet in order to operate, the safeguard application 104 may be communicatively coupled to such remote entities as a cloud computing device via network interface 114 for purposes of downloading the most up-to-date algorithms.

In accordance with a third aspect of an exemplary embodiment, customized incentives and personal analytics are incorporated by the incentives/personal analytics module 112 in FIG. 1 to improve D2T2M behavior by the mobile device 102 user. Beyond regulations and law enforcement, the versatility, accuracy, respect for privacy, adaptability, and reliability of the safeguard system disclosed herein offer incentives to the user to reduce D2T2M encourage mobile device 102 users to adopt the disclosed safeguard system and to improve their behavior towards D2T2M.

The use of incentives and coaching serves as an alternative to other behavior modification measures such as fines by law enforcement. Coaching may be embodied in the form of instructions or notices provided to the user of the mobile device 102 when the user is not in a vehicle or when the vehicle has come to a complete stop. Specifically, the instructions or notices are provided to the user based on data collected by the safeguard application 104 relating to the user's use of the mobile device 102 while the vehicle was moving. The intent is to notify the user of near-crash scenarios that were avoided as a result of the safeguard restrictions imposed by the safeguard application and to encourage the user to avoid future D2T2M behavior.

For some embodiments, the coaching feature may include providing access to a D2T2M network platform via the network interface 114 where D2T2M experiences among a community of users are shared. Local regulations and campaign ads discouraging D2T2M behavior may also be displayed to the user as part of the coaching feature executed by the incentives/personal analytics module 112. The incentives/personal analytics module 112 may also provide a direct communication link with the user's insurance provider, where the insurance provider is able to provide discounts and/or other incentives for using the safeguard application 104 and for sharing their D2T2M data history with other users.

In much the same way telecom providers share a large part of mobile device cost, car insurance companies could provide rewards on a yearly basis to those who adopt the disclosed safeguard system and to those who elect to share their personal information stored in user data safe box 130 described earlier. Such personal information may comprise, for example, a D2T2M history. Rewards may comprise, for example, a discount on insurance premiums.

This business model makes sense as car crashes due to D2T2M would go down drastically through the use of the disclosed safeguard system, thereby saving auto insurance providers a substantial amount of money. The D2T2M history may also include extra features that may be analyzed by the sonar component disclosed above, including, for example, driving patterns to be used either by the sole driver for improving his driving attention and performance by acting as a personal analytics based self-coaching and/or used by auto insurance providers to further reward safe driving patterns.

Figure 2:
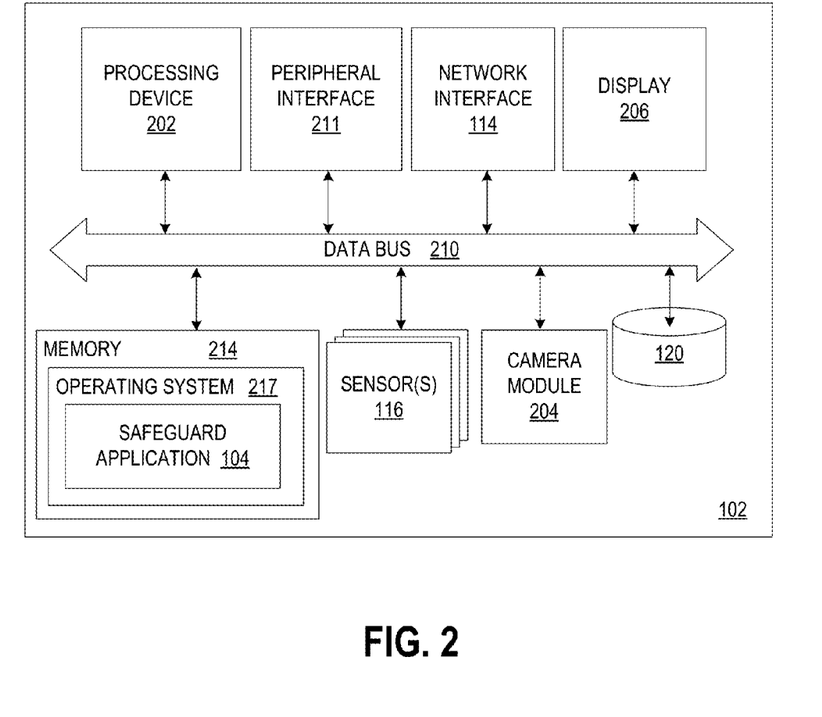
FIG. 2 is a schematic diagram of the mobile device of FIG. 1 in accordance with various embodiments of the present disclosure.

FIG. 2 is a schematic diagram of the mobile device 102 shown in FIG. 1. The mobile device 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the mobile device 102 comprises memory 214, a processing device 202, sensors 116 (accelerometer, microphones, etc.), a network interface 114, a display 206, a peripheral interface 211, a camera module 204, and mass storage 120, wherein each of these devices are connected across a local data bus 210.

The processing device 202 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software such as the safeguard application 104 executing in the mobile device 102 of FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. Input/output interfaces provide any number of interfaces for the input and output of data.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical). With further reference to FIG. 2, network interface 114 comprises various components used to transmit and/or receive data over a network environment. The mobile device 102 may communicate with one or more computing devices via the network interface 114 over the network 126 (FIG. 1).

Figure 3:
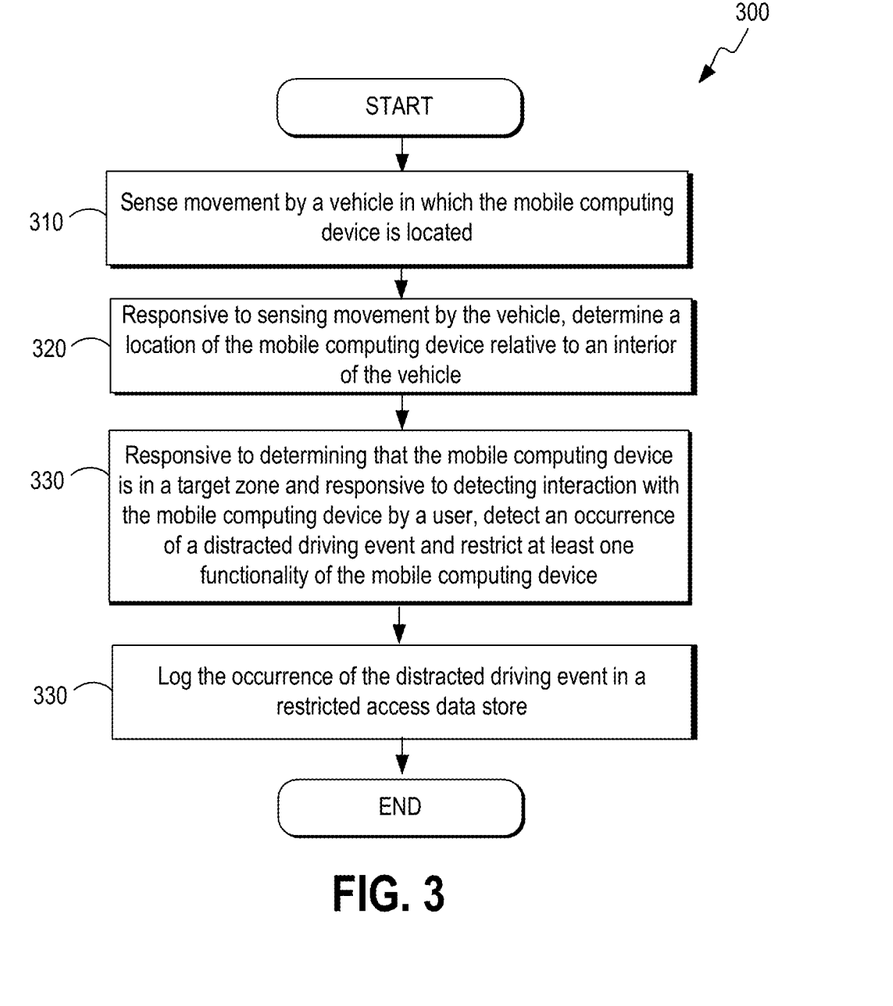
FIG. 3 is a top-level flowchart illustrating examples of functionality implemented as portions of the mobile device of FIG. 1 for restricting D2T2M behavior according to various embodiments of the present disclosure.

FIG. 3 is a top-level flowchart illustrating examples of functionality implemented as portions of the mobile device 102 of FIG. 1 for restricting D2T2M behavior according to various embodiments of the present disclosure. It is understood that the flowchart 300 of FIG. 3 provides merely an example of the many different types of functional arrangements that may be employed to implement the operation of the various components of the mobile device 102. As an alternative, the flowchart of FIG. 3 may be viewed as depicting an example of steps of a method implemented in the mobile device 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the mobile device 102 senses movement by a vehicle in which the mobile device 102 is located. In block 320, in response to sensing movement by the vehicle, the mobile device 102 determines a location of the mobile computing device relative to an interior of the vehicle. In block 330, in response to determining that the mobile device 102 is in a target zone and in response to detecting interaction with the mobile device 102 by a user, the mobile device 102 detects an occurrence of a distracted driving event and restricts at least one functionality of the mobile computing device. In block 340, the mobile device 102 logs the occurrence of the distracted driving event in a restricted access data store.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure.

At least the following is claimed:

1. A method implemented in a mobile handheld computing device, comprising:
    sensing, by the mobile handheld computing device, movement by a vehicle in which the mobile handheld computing device is located;
    responsive to sensing movement by the vehicle, determining, by the mobile handheld computing device, a location of the mobile handheld computing device relative to an interior of the vehicle; wherein determining the location of the mobile handheld computing device relative to the interior of the vehicle comprises: capturing an approximately 360° view around the mobile handheld computing device by alternately capturing digital images with a back facing camera and a front facing camera in the mobile handheld computing device on a periodic basis for a predetermined amount of time; analyzing attributes of a user of the mobile handheld computing device; and based on the analysis, determining the location of the mobile handheld computing device;
    responsive to determining that the mobile handheld computing device is in a target zone and responsive to detecting interaction with the mobile handheld computing device by a user, detecting, by the mobile handheld computing device, an occurrence of a distracted driving event and restricting at least one functionality of the mobile handheld computing device; and
    logging, by the mobile handheld computing device, the occurrence of the distracted driving event in a restricted access data store.

2. The method of claim 1, wherein the at least one functionality comprises at least one of: electronic messaging and voice service.

3. The method of claim 1, further comprising providing a message to a user of the mobile handheld computing device indicating restriction of the at least one functionality.

4. The method of claim 3, wherein the message further provides customized incentives and personal analytics to the user to deter further interaction with the mobile handheld computing device while the mobile handheld computing device is in the target zone.

5. The method of claim 3, wherein the message is provided via at least one of:
    an audio message output from a speaker on the mobile handheld computing device; and
    a message shown on a display of the mobile handheld computing device.

6. The method of claim 1, further comprising removing the restriction of the at least one functionality upon detecting at least one of:
    the vehicle remaining stationary for a predetermined period of time; and
    determination that the mobile handheld computing device is no longer located in the target zone.

7. The method of claim 1, wherein the analyzed attributes comprise at least one of:
    single-handed operation of the mobile handheld computing device by the user;
    intermittent eye contact with the mobile handheld computing device; and
    positioning of the user's hands and arms.

8. A method implemented in a mobile handheld computing device, comprising:
    sensing, by the mobile handheld computing device, movement by a vehicle in which the mobile handheld computing device is located;
    responsive to sensing movement by the vehicle, determining, by the mobile handheld computing device, a location of the mobile handheld computing device relative to an interior of the vehicle; wherein determining the location of the mobile handheld computing device relative to the interior of the vehicle comprises:

dividing the interior of the vehicle into a driver zone and a non-driver zone, the target zone comprising the driver zone; emitting a plurality of acoustic signals; receiving echoes corresponding to reflection of the acoustic signals within the interior of the vehicle; generating an approximate three-dimensional (3D) map, the 3D map depicting a location of the mobile handheld computing device relative to the interior of the vehicle; and determining whether the mobile handheld computing device is located in the driver zone based on the 3D map;

responsive to determining that the mobile handheld computing device is in a target zone and responsive to detecting interaction with the mobile handheld computing device by a user, detecting, by the mobile handheld computing device, an occurrence of a distracted driving event and restricting at least one functionality of the mobile handheld computing device; and logging, by the mobile handheld computing device, the occurrence of the distracted driving event in a restricted access data store.

9. The method of claim 8, wherein the plurality of acoustic signals comprises a plurality of time-frequency modulated chirps with associated audio profiles.

10. The method of claim 8, wherein generating the approximate 3D map comprises performing time-frequency analysis on the received echoes and determining at least one of: a number of delays corresponding to each emitted acoustic signal; delay values, delay amplitudes, and shapes of the received echoes.

11. A system, comprising:
a mobile handheld computing device further comprising:
 a memory configured to store computer-executable instructions; and
 a processor configured to execute the computer-executable instructions to cause the mobile handheld computing device to at least:
  sense movement by a vehicle in which the mobile handheld computing device is located;
  responsive to sensing movement by the vehicle, determine a location of the mobile handheld computing system relative to an interior of the vehicle; wherein determining the location of the mobile handheld computing device relative to the interior of the vehicle comprises: capturing an approximately 360° view around the mobile handheld computing device by alternately capturing digital images with a back facing camera and a front facing camera in the mobile handheld computing device on a periodic basis for a predetermined amount of time; analyzing attributes of a user of the mobile handheld computing device; and based on the analysis, determining the location of the mobile handheld computing device;
  responsive to determining that the mobile handheld computing system is in a target zone and responsive to detecting interaction with the mobile handheld computing system, detect an occurrence of a distracted driving event and restricting at least one functionality of the mobile handheld computing system; and
  log the occurrence of the distracted driving event in a restricted access data store.

12. The system of claim 11, wherein the processor is further configured to execute the computer-executable instructions to allocate additional resources in the mobile handheld computing device responsive to determining that an engine of the vehicle is in an on state.

13. The system of claim 11, wherein the at least one functionality comprises at least one of: electronic messaging and voice service.

14. The system of claim 11, wherein the processor is further configured to execute the computer-executable instructions to provide a message to a user of the mobile handheld computing device indicating restriction of the at least one functionality.

15. The system of claim 14, wherein the message further provides customized incentives and personal analytics to the user to deter further interaction with the mobile handheld computing device while the mobile handheld computing device is in the target zone.

16. The system of claim 11, wherein the processor is further configured to execute the computer-executable instructions to remove the restriction of the at least one functionality of the mobile handheld computing device upon detecting at least one of:
 the vehicle remaining stationary for a predetermined period of time; and
 determination that the mobile handheld computing device is no longer located in the target zone.

17. A non-transitory computer-readable medium embodying a program executable in a mobile handheld computing device, comprising:
 code that senses movement by a vehicle in which the mobile handheld computing system is located;
 code that determines a location of the mobile handheld computing system relative to an interior of the vehicle responsive to sensing movement by the vehicle; wherein determining the location of the mobile handheld computing device relative to the interior of the vehicle comprises: capturing an approximately 360° view around the mobile handheld computing device by alternately capturing digital images with a back facing camera and a front facing camera in the mobile handheld computing device on a periodic basis for a predetermined amount of time; analyzing attributes of a user of the mobile handheld computing device; and based on the analysis, determining the location of the mobile handheld computing device;
 code that detects, responsive to determining that the mobile handheld computing system is in a target zone and responsive to detecting interaction with the mobile handheld computing system, an occurrence of a distracted driving event and restricting at least one functionality of the mobile handheld computing system; and
 code that logs the occurrence of the distracted driving event in a restricted access data store.

18. The non-transitory computer-readable medium of claim 17, wherein the detected interaction comprises text messaging by a user of the mobile handheld computing system, and wherein the target zone corresponds to a driver position within the vehicle.

19. The non-transitory computer-readable medium of claim 17, further comprising code that removes the restriction of the at least one functionality of the mobile handheld computing device upon detecting at least one of:
 the vehicle remaining stationary for a predetermined period of time; and determination that the mobile handheld computing device is no longer located in the target zone.

20. A system, comprising:
a mobile handheld computing device further comprising:
- a memory configured to store computer-executable instructions; and
- a processor configured to execute the computer-executable instructions to cause the mobile handheld computing device to at least:
  - sense movement by a vehicle in which the mobile handheld computing device is located;
  - responsive to sensing movement by the vehicle, determine a location of the mobile handheld computing system relative to an interior of the vehicle; wherein determining the location of the mobile handheld computing device relative to the interior of the vehicle comprises: dividing the interior of the vehicle into a driver zone and a non-driver zone, the target zone comprising the driver zone; emitting a plurality of acoustic signals; receiving echoes corresponding to reflection of the acoustic signals within the interior of the vehicle; generating an approximate three-dimensional (3D) map, the 3D map depicting a location of the mobile handheld computing device relative to the interior of the vehicle; and determining whether the mobile handheld computing device is located in the driver zone based on the 3D map;
  - responsive to determining that the mobile handheld computing system is in a target zone and responsive to detecting interaction with the mobile handheld computing system, detect an occurrence of a distracted driving event and restricting at least one functionality of the mobile handheld computing system; and
  - log the occurrence of the distracted driving event in a restricted access data store.

21. A non-transitory computer-readable medium embodying a program executable in a mobile handheld computing device, comprising:
- code that senses movement by a vehicle in which the mobile handheld computing system is located;
- code that determines a location of the mobile handheld computing system relative to an interior of the vehicle responsive to sensing movement by the vehicle; wherein determining the location of the mobile handheld computing device relative to the interior of the vehicle comprises: dividing the interior of the vehicle into a driver zone and a non-driver zone, the target zone comprising the driver zone; emitting a plurality of acoustic signals; receiving echoes corresponding to reflection of the acoustic signals within the interior of the vehicle; generating an approximate three-dimensional (3D) map, the 3D map depicting a location of the mobile handheld computing device relative to the interior of the vehicle; and determining whether the mobile handheld computing device is located in the driver zone based on the 3D map;
- code that detects, responsive to determining that the mobile handheld computing system is in a target zone and responsive to detecting interaction with the mobile handheld computing system, an occurrence of a distracted driving event and restricting at least one functionality of the mobile handheld computing system; and
- code that logs the occurrence of the distracted driving event in a restricted access data store.

* * * * *